United States Patent
Hayakawa et al.

(10) Patent No.: US 10,239,019 B2
(45) Date of Patent: Mar. 26, 2019

(54) REVERSE-OSMOSIS-MEMBRANE DEVICE AND METHOD FOR OPERATING THE SAME

(71) Applicant: KURITA WATER INDUSTRIES LTD., Tokyo (JP)

(72) Inventors: Kunihiro Hayakawa, Tokyo (JP); Takahiro Kawakatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 64 days.

(21) Appl. No.: 15/504,350

(22) PCT Filed: Aug. 19, 2014

(86) PCT No.: PCT/JP2014/071609
§ 371 (c)(1),
(2) Date: Feb. 16, 2017

(87) PCT Pub. No.: WO2016/027302
PCT Pub. Date: Feb. 25, 2016

(65) Prior Publication Data
US 2017/0232389 A1    Aug. 17, 2017

(51) Int. Cl.
| | |
|---|---|
| *B01D 61/12* | (2006.01) |
| *B01D 61/02* | (2006.01) |
| *C02F 1/44* | (2006.01) |
| *B01D 63/10* | (2006.01) |
| *B01D 61/04* | (2006.01) |
| *B01D 61/08* | (2006.01) |
| *C02F 9/00* | (2006.01) |
| *C02F 3/12* | (2006.01) |
| *C02F 1/00* | (2006.01) |
| *C02F 1/24* | (2006.01) |
| *C02F 1/52* | (2006.01) |
| *C02F 101/30* | (2006.01) |

(52) U.S. Cl.
CPC .......... *B01D 61/12* (2013.01); *B01D 61/025* (2013.01); *B01D 61/04* (2013.01); *B01D 61/08* (2013.01); *B01D 63/10* (2013.01); *B01D 63/103* (2013.01); *C02F 1/441* (2013.01); *C02F 9/00* (2013.01); *B01D 2311/04* (2013.01); *B01D 2311/16* (2013.01); *B01D 2311/2688* (2013.01); *B01D 2313/143* (2013.01); *B01D 2313/146* (2013.01); *B01D 2325/04* (2013.01); *C02F 1/001* (2013.01); *C02F 1/24* (2013.01); *C02F 1/52* (2013.01); *C02F 3/1268* (2013.01); *C02F 3/1273* (2013.01); *C02F 2101/30* (2013.01); *Y02W 10/15* (2015.05)

(58) Field of Classification Search
CPC .......... B01D 2311/16; B01D 2313/143; B01D 2313/146; B01D 61/025; B01D 61/12; B01D 63/10; B01D 2311/04; B01D 2311/2688; B01D 2325/04; B01D 61/04; B01D 61/08; B01D 63/103; C02F 1/441; C02F 3/1268; C02F 1/001; C02F 1/24; C02F 1/52; C02F 3/1273; C02F 9/00; C02F 2101/30; Y02W 10/15
See application file for complete search history.

(56) References Cited

U.S. PATENT DOCUMENTS

| | | | |
|---|---|---|---|
| 2012/0043272 A1 | 2/2012 | Yoshida et al. | |
| 2016/0016122 A1 | 1/2016 | Hayakawa et al. | |

FOREIGN PATENT DOCUMENTS

| | | |
|---|---|---|
| JP | 2011-212602 A | 10/2011 |
| JP | 2013-202525 A | 10/2013 |
| JP | 2014-159015 A | 9/2014 |

OTHER PUBLICATIONS

English translation Japanese Patent Application No. 2011-212602. (Year: 2011).*
Singapore Patent Office, "Office Action for Singaporean Patent Application No. 11201701131R," dated Oct. 27, 2017.
C. R. Bartels et al., "Design considerations for wastewater treatment by reverse osmosis," Water Science & Technology, 2005, p. 473-482, vol. 51, No. 6-7, IWA Publishing.
PCT/ISA/210, "International Search Report for International Application No. PCT/JP2014/071609," dated Sep. 30, 2014.
"Practical Membrane Separation Technique for Users", Nikkan Kogyo Shimbun, Ltd., Apr. 30, 1996, p. 6-9, First Edition, First Printing.
"Technique for Manufacturing Water Treatment Membrane and Evaluation of Materials of Water Treatment Membrane", Science & Technology Co., Ltd., Jan. 30, 2012, p. 11-13, First Edition, First Printing.

* cited by examiner

*Primary Examiner* — John Kim
(74) *Attorney, Agent, or Firm* — Manabu Kanesaka

(57) ABSTRACT

Provided are reverse-osmosis-membrane device capable of treating raw water including a large amount of membrane foulants, such as MBR-treated water, with stability while preventing a reduction in the amount of permeate, and a method for operating the reverse-osmosis-membrane device. The raw water includes a high-molecular organic substance having a molecular weight of 10,000 or more at a concentration of 0.01 ppm or more. The reverse-osmosis-membrane device includes a reverse-osmosis-membrane element including a membrane unit, the membrane unit including a reverse osmosis membrane having a thickness of 0.1 mm or less, a feed spacer disposed on a surface of the reverse osmosis membrane, and a permeate spacer disposed on the other surface of the reverse osmosis membrane. The reverse-osmosis-membrane device is operated at a permeation flux of 0.6 m/d or less.

7 Claims, 2 Drawing Sheets

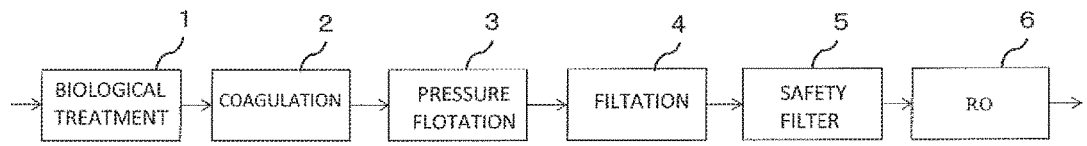
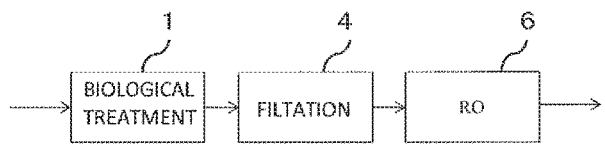
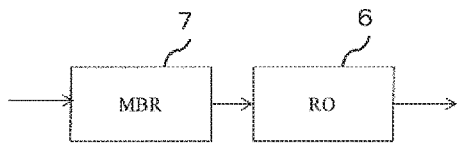
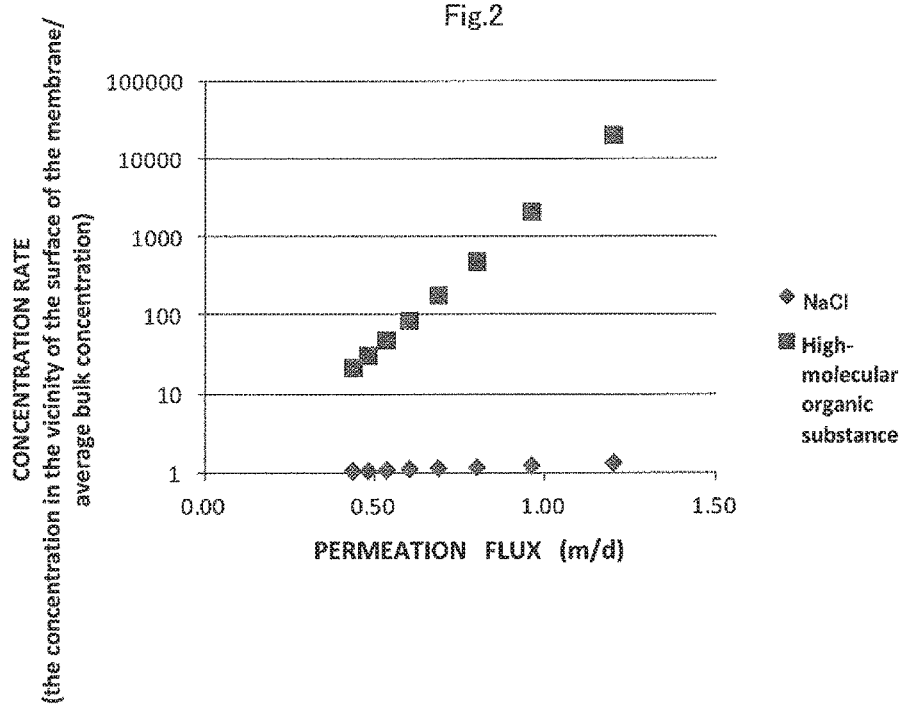

REVERSE-OSMOSIS-MEMBRANE DEVICE AND METHOD FOR OPERATING THE SAME

RELATED APPLICATIONS

The present application is National Phase of International Application No. PCT/JP2014/071609 filed Aug. 19, 2014, the disclosure of which is hereby incorporated by reference herein in its entirety.

FIELD OF INVENTION

The present invention relates to a reverse-osmosis-membrane device that treats water including a high-molecular organic substance that may adsorb onto a membrane and contaminate the membrane, such as MBR-treated water, and a method for operating the reverse-osmosis-membrane device. The present invention also relates to a method for treating biologically treated water with the reverse-osmosis-membrane device.

BACKGROUND OF INVENTION

In seawater desalination, ultrapure water production, industrial water treatment, wastewater reclamation, and the like, reverse osmosis membranes have been used for removing ions, organic substances, and the like included in raw water (see, non-patent literature 1). The permeation flux of a reverse osmosis membrane may be reduced by microorganisms that proliferate on the surface of the membrane and organic substances adsorbed on the surface of the membrane. Furthermore, a reverse osmosis membrane may be clogged with solid particles. This increases the pressure difference across a module. Accordingly, a reverse osmosis membrane needs to be cleaned periodically in order to restore the permeation flux of the membrane and the difference in pressure between the feed-side end and the concentrate-side end portion of an element (hereinafter, referred to as "pressure difference across an element").

Some reverse-osmosis-membrane devices include an element having a membrane structure referred to as "spiral structure". An example of the spiral membrane elements used in the related art is a spiral membrane element produced by bonding two reverse osmosis membranes disposed on respective surfaces of a permeate spacer along three sides thereof in order to form a bag-like membrane, attaching an opening portion of the bag-like membrane to a permeate collection tube, and subsequently winding the bag-like membrane around the outer periphery of the permeate collection tube with a net-like feed spacer in a spiral form. The raw water fed from an end portion of the element flows along the feed spacer and is discharged from the other end portion as a concentrate. While the raw water flows along the feed spacer, it passes through the reverse osmosis membrane as a permeate. The permeate flows into the permeate collection tube along the permeate spacer and is discharged from an end portion of the permeate collection tube.

In the spiral membrane element, the feed spacer, which is interposed between the bag-like membranes wound around the permeate collection tube, forms a raw-water path. Therefore, increasing the thickness of the feed spacer included in the spiral membrane element reduces the likelihood of the raw-water channel being clogged with solid particles and prevents an increase in the pressure difference across the element, a reduction in the amount of permeate, and the degradation of the quality of the permeate which may result from the accumulation of the solid particles. Spiral reverse-osmosis-membrane elements that include a feed spacer having a large thickness in order to reduce the occurrence of clogging with solid particles are on the market.

However, increasing the thickness of the feed spacer reduces the area of the membrane per element and the amount of permeate per element. The area of the membrane included in a commercially available spiral reverse-osmosis-membrane element is 42 $m^2$ (440 $ft^2$) or less.

Moreover, increasing the thickness of the feed spacer does not cause a reduction in the permeation flux which results from the adsorption of membrane foulants onto the membrane. Reducing the thickness of the feed spacer in order to increase the area of the membrane per element increases the risk of the channel being clogged with solid particles.

Organic wastewater, such as sewage, may be treated by a membrane-separation activated sludge process in which a membrane bioreactor (MBR) is used. The wastewater is subjected to an activated sludge process in a biological treatment tank. A liquid including activated sludge is subjected to solid-liquid separation in an immersed membrane-separation device, which is arranged in the biological treatment tank to be immersed in the liquid. non-patent literature 2 discloses a method for treating organic wastewater in which water treated with an MBR (permeate obtained by filtration through the filter included in the immersed membrane-separation device) is directly fed into a reverse-osmosis-membrane device and subjected to reverse-osmosis-membrane separation.

The MBR-treated water includes a large amount of high-molecular organic substance having a molecular weight of 10,000 or more, which acts as a membrane foulant. Accordingly, in a reverse-osmosis-membrane device that treats the MBR-treated water, the permeation flux may decrease with time, and the difference in pressure across the membrane may be increased.

CITATION LIST

Non-patent literature 1: "Practical Membrane Separation Technique for Users", published by Nikkan Kogyo Shimbun, Ltd. on Apr. 30, 1996, first edition, first printing, page 6

Non-patent literature 2: "Technique for Manufacturing Water Treatment Membrane and Evaluation of Materials of Water Treatment Membrane", published by Science & Technology Co., Ltd. on Jan. 30, 2012, first Edition, first Printing, page 11

SUMMARY OF INVENTION

An object of the present invention is to provide a reverse-osmosis-membrane device capable of treating raw water including a large amount of membrane foulants, such as MBR-treated water, with stability while preventing a reduction in the amount of permeate, a method for operating the reverse-osmosis-membrane device, and a method for treating biologically treated water with the reverse-osmosis-membrane device.

It is known that, when the degree of concentration polarization on the surface of a reverse osmosis membrane is large, the solute concentration in the vicinity of the surface of the membrane is increased. The inventors of the present invention inspected a spiral reverse-osmosis-membrane element and, as a result, found the following facts.

1) Reducing the permeation flux of the membrane reduces the degree of concentration polarization.

2) Increasing the water-feeding linear velocity in the vicinity of the surface of the membrane reduces the degree of concentration polarization.

3) An increase in the molecular weight of the solute results in an increase in the degree of concentration polarization.

The inventors further found the following facts.

The substances responsible for the contamination of the membrane, which causes fouling, are high-molecular organic substances having a molecular weight of 10,000 or more and, in particular, metabolites of living organisms, such as polysaccharides and proteins. When concentration polarization is caused by such high-molecular organic substances, the permeation flux and the amount of permeate are significantly reduced.

When the thickness of a reverse osmosis membrane is reduced, the area of the membrane per element is increased. In such a case, the permeation flux can be reduced compared with the spiral reverse-osmosis-membrane elements used in the related art while the amount of permeate is maintained to be constant. Moreover, operating a reverse-osmosis-membrane device such that the permeation flux is equal to or smaller than a specific value reduces the degree of concentration polarization and prevents reductions in the permeation flux and the amount of permeate.

Reducing the thickness of the feed spacer in order to increase the area of the membrane per element increases the risk of the channel being clogged in the case where the raw water includes a large amount of solid particles. On the other hand, reducing the thickness of a base material of the membrane enables the area of the membrane per element to be increased without reducing the thickness of the feed spacer.

The present invention was made on the basis of the above-described facts. The summary of the present invention is as follows.

[1] A method for operating a reverse-osmosis-membrane device that treats raw water including a high-molecular organic substance, the raw water including a high-molecular organic substance having a molecular weight of 10,000 or more at a concentration of 0.01 ppm or more, the reverse-osmosis-membrane device including a reverse-osmosis-membrane element including a membrane unit, the membrane unit including a reverse osmosis membrane having a thickness of 0.1 mm or less, a feed spacer disposed on a surface of the reverse osmosis membrane, and a permeate spacer disposed on the other surface of the reverse osmosis membrane, the method comprising operating the reverse-osmosis-membrane device such that a permeation flux of 0.6 m/d or less is achieved.

[2] The method for operating the reverse-osmosis-membrane device according to [1], wherein the permeation flux is 0.45 m/d or less.

[3] The method for operating the reverse-osmosis-membrane device according to [1], wherein the reverse-osmosis-membrane element is a spiral reverse-osmosis-membrane element.

[4] The method for operating the reverse-osmosis-membrane device according to any one of [1] to [3], wherein the raw water is water treated with a membrane bioreactor.

[5] A reverse-osmosis-membrane device that treats raw water including a high-molecular organic substance having a molecular weight of 10,000 or more at a concentration of 0.01 ppm or more, the reverse-osmosis-membrane device including a reverse-osmosis-membrane element including a membrane unit, the membrane unit including a reverse osmosis membrane having a thickness of 0.1 mm or less, a feed spacer disposed on a surface of the reverse osmosis membrane, and a permeate spacer disposed on the other surface of the reverse osmosis membrane, the reverse-osmosis-membrane device being operated such that a permeation flux of 0.6 m/d or less is achieved.

[6] A method for treating biologically treated water, the method comprising treating biologically treated water by reverse-osmosis-membrane separation with the reverse-osmosis-membrane device according to [5].

Advantageous Effects of Invention

According to the present invention, it is possible to treat raw water including a large amount of membrane foulants, such as MBR-treated water, by reverse-osmosis-membrane separation with stability while preventing a reduction in the amount of permeate.

According to the present invention, it is possible to increase the area of a reverse osmosis membrane per element by reducing the thickness of the membrane. This allows the permeation flux to be reduced compared with the spiral reverse-osmosis-membrane elements used in the related art while the amount of permeate per one element is maintained to be constant. Operating a reverse-osmosis-membrane device such that the permeation flux is equal to or smaller than a specific value reduces the degree of concentration polarization in the vicinity of the surface of the membrane and prevents a reduction in the amount of permeate. This enables a consistent treatment to be performed for a prolonged period of time.

BRIEF DESCRIPTION OF DRAWINGS

FIG. 1 includes system diagrams illustrating a method for treating biologically treated water according to an embodiment of the present invention.

FIG. 2 is a graph illustrating the relationships between the permeation flux and the concentration rate in reverse-osmosis-membrane separation treatments in which the raw water is an aqueous NaCl solution or water including a high-molecular organic substance having an average molecular weight of 10,000.

DESCRIPTION OF EMBODIMENTS

Figure 3:
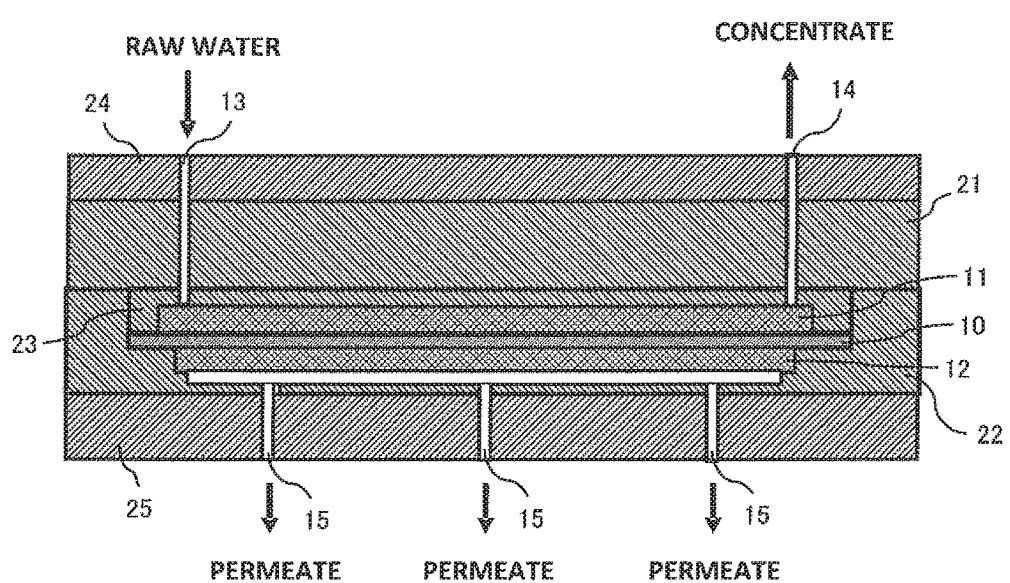
FIG. 3 is a schematic cross-sectional view of a flat-membrane cell used in Examples, illustrating the structure thereof.

The detail of embodiments of the present invention is described below.

<Raw Water>

The raw water treated by reverse-osmosis-membrane separation in the reverse-osmosis-membrane device according to the present invention includes a high-molecular organic substance having a molecular weight of 10,000 or more at a concentration of 0.01 ppm or more. High-molecular organic substances having a molecular weight of 10,000 or more and, in particular, metabolites of living organisms, such as polysaccharides and proteins, are likely to foul the membrane and reduce the permeation flux. The concentration of the high-molecular organic substance in the raw water is preferably 0.05 to 0.5 ppm.

Examples of water including such a high-molecular organic substance include water produced by wastewater reclamation, water produced by biologically treating a wastewater, and, in particular, water produced by treating a wastewater with an MBR.

The concentration of the high-molecular organic substance having a molecular weight of 10,000 or more in water may be determined by using equipment that measures TOC and the like by performing the fractionation of molecular weight by chromatography such as LC-OCD (liquid chromatography-organic carbon detection) or HPLC (high-performance liquid chromatography). A measurement method in which the TOC is determined after substances having a molecular weight of 10,000 or more and substances having a molecular weight of less than 10,000 have been separated from each other by using a UF membrane having a cutoff molecular weight of 10,000 may also be used. The measurement method is not limited to the above methods.

<Reverse Osmosis Membrane>

The reverse osmosis membrane used in the present invention has a thickness of 0.1 mm or less. The thickness of common reverse osmosis membranes used in the related art is about 0.13 mm. If the thickness of the reverse osmosis membrane exceeds 0.1 mm, the area of the membrane per element and the amount of permeate may fail to be increased to sufficient degrees.

If the thickness of the reverse osmosis membrane is excessively small, the strength of the membrane may be reduced to an insufficient level. The thickness of the reverse osmosis membrane used in the present invention is preferably about 0.01 to 0.1 mm and is particularly preferably about 0.03 to 0.07 mm.

It is preferable to use a membrane having a high rejection. As a material of the reverse osmosis membrane an aromatic polyamide membrane synthesized from phenylenediamine and an acid chloride on a base material is preferable. However, the material of the reverse osmosis membrane is not limited to this. The above aromatic polyamide membrane can be synthesized by, for example, the method described in Japanese Unexamined Patent Application Publication No. 8-224452, Japanese Unexamined Patent Application Publication No. 9-253455, Japanese Unexamined Patent Application Publication No. 10-174852, or Japanese Unexamined Patent Application Publication No. 2006-95476.

The base material of the reverse osmosis membrane is preferably a sheet-like material. A nonwoven fabric made from long fibers is suitably used as a sheet-like base material in order to maintain the strength of the membrane even when the thickness of the membrane is small and allow the thickness of a polymer layer such as a polysulfone layer, which is to be deposited on the base material, to be reduced. Examples of such a base material include long-fiber nonwoven fabrics described in Japanese Unexamined Patent Application Publication No. 2009-57654, International Publication No. WO2010/126109, and International Publication No. WO2010/126113.

The reverse osmosis membrane preferably include a long-fiber nonwoven fabric and an aromatic polyamide-based dense layer formed thereon with a polymer layer such as polysulfone layer interposed therebetween. The thickness of the long-fiber nonwoven fabric is preferably 10 to 100 μm. The thickness of the polymer layer is preferably 1 to 40 μm. The thickness of the aromatic polyamide-based dense layer is preferably 0.01 to 1 μm.

<Reverse-Osmosis-Membrane Element>

The reverse-osmosis-membrane element charged in the reverse-osmosis-membrane device preferably includes a membrane unit including a flat reverse osmosis membrane; a feed spacer disposed on the primary side (one of the surfaces) of the membrane through which the raw water is passed; and a permeate spacer disposed on the secondary side (the other surface) of the membrane through which the permeate is passed. The reverse-osmosis-membrane element may include a plurality of membrane units stacked on top of one another. The reverse-osmosis-membrane element may be a spiral reverse-osmosis-membrane element formed by winding the above membrane unit in a spiral form. The spiral reverse-osmosis-membrane element may be suitable in terms of space efficiency.

The diameter of the spiral reverse-osmosis-membrane element may be, but not limited to, 4, 8, or 16 inches. The length of the element is commonly, but not limited to, about 1 m.

The feed spacer and the permeate spacer are preferably, but not limited to, mesh-like spacers constituted by a plurality of wires composed of a resin such as polyethylene or polypropylene which have the same or different diameters, the wires being arranged at the regular intervals and being arranged to intersect one another at an angle of 45 to 90 degrees.

If the thickness of the feed spacer is excessively small, the risk of the channel being clogged with solid particles may be increased. On the other hand, if the thickness of the feed spacer is excessively large, the area of the membrane per element and the permeation flux are reduced. Thus, the thickness of the feed spacer is preferably 0.6 to 0.9 mm. Feed spacers having thicknesses of, for example, 0.69 mm (26 mil), 0.71 mm (28 mil), and 0.86 mm (34 mil) are commercially available.

The thickness of the permeate spacer is not limited but preferably 0.1 to 0.25 mm. If the thickness of the permeate spacer is excessively large, the area of the membrane per element is reduced as in the case where the thickness of the feed spacer is excessively large. On the other hand, if the thickness of the permeate spacer is excessively small, the pressure difference is increased and the amount of permeate is reduced.

<Permeation Flux>

In the present invention, a reverse-osmosis-membrane device including the above-described reverse osmosis membrane having a thickness of 0.1 mm or less is operated such that the permeation flux is 0.6 m/d or less.

The pure-water permeation flux of a reverse-osmosis-membrane device at normal operating pressure is normally 0.7 to 0.85 m/d. In the case where raw water including inorganic salts or organic substances is passed through the reverse-osmosis-membrane device, the permeation flux is commonly set to about 0.5 to 0.7 m/d.

The inventor of the present invention experimentally confirmed that a high-molecular organic substance having a molecular weight of 10,000 or more is a substance that contaminates a reverse osmosis membrane and that the permeation flux of the membrane is significantly reduced when the concentration of the high-molecular organic substance in the vicinity of the surface of the membrane exceeds 1 ppm. The inventor of the present invention found that, in the case where the concentration of the high-molecular organic substance having a molecular weight of 10,000 or more in the raw water is 0.01 ppm or more, the permeation flux of the membrane is significantly reduced when the concentration rate in the vicinity of the surface of the membrane exceeds 100 times. For controlling the concentration rate not to exceed 100 times, it is necessary to set the permeation flux to 0.6 m/d or less. Accordingly, in the present invention, the reverse-osmosis-membrane device is operated such that the permeation flux is 0.6 m/d or less and preferably 0.45 m/d or less. However, reducing the permeation flux to an excessively low level increases the number of membranes required and not economical. Thus, the permeation flux is preferably 0.2 m/d or more.

The amount of concentrate adequate for an 8-inch spiral reverse-osmosis-membrane element is 2.0 to 8.0 m³/h. The linear velocity corresponding to the above amount of concentrate is 0.05 to 0.15 m/s.

<Treatment of Biologically Treated Water>

The reverse-osmosis-membrane device according to the present invention may be suitably used for, in particular, treating biologically treated water by reverse-osmosis-membrane separation.

FIGS. 1a, 1b, and 1c are system diagrams illustrating a method for treating biologically treated water according to an embodiment of the present invention, in which the reverse-osmosis-membrane device according to the present invention is used.

In FIG. 1a, biologically treated water that has been treated in aerobic and/or anaerobic biological treatment means 1, coagulation treatment means 2, solid-liquid separation means 3 such as pressure flotation, and filtration means 4 is passed through a safety filter 5, subsequently introduced to a reverse-osmosis-membrane device 6, and treated by reverse-osmosis-membrane separation. In FIG. 1b, water treated in biological treatment means 1 is directly subjected to solid-liquid separation in filtration means 4 such as a membrane filtration device, subsequently introduced to a reverse-osmosis-membrane device 6, and treated by reverse-osmosis-membrane separation. In FIG. 1c, water treated with an MBR (immersed membrane-separation device) 7 is directly introduced to a reverse-osmosis-membrane device 6 and subsequently treated. The present invention is not limited by the above methods.

EXAMPLES

The present invention is described more specifically with reference to Reference examples, Examples, and Comparative examples below.

Reference Example 1

Eight-inch spiral reverse-osmosis-membrane elements each including a feed spacer having a thickness of 0.71 mm, a permeate spacer having a thickness of 0.23 mm, and a reverse osmosis membrane having a different thickness were prepared. For each of the above reverse-osmosis-membrane elements, the area of the membrane per element and the permeation flux corresponding to the amount of permeate of 1.1 m³/h were calculated. Table 1 summarizes the results.

TABLE 1

| Thickness of reverse osmosis membrane (mm) | Area of membrane (m²) | Permeation flux (m/d) |
| --- | --- | --- |
| 0.13 | 41.8 | 0.63 |
| 0.10 | 44.0 | 0.60 |
| 0.08 | 45.6 | 0.58 |
| 0.06 | 47.3 | 0.56 |
| 0.03 | 50.2 | 0.526 |

The results shown in Table 1 confirm that reducing the thickness of the reverse osmosis membrane increases the area of the membrane per element and enables the permeation flux to be reduced while the amount of permeate is maintained to be constant.

Reference Example 2

The relationship of the permeation flux and the concentration rate (the concentration in the vicinity of the surface of the membrane/average bulk concentration) in a reverse-osmosis-membrane separation treatment was determined for each of the case where an aqueous NaCl solution was used as raw water and the case where water including a high-molecular organic substance having an average molecular weight of 10,000 was used as raw water. FIG. 2 illustrates the results.

The results shown in FIG. 2 confirm that, in general, the concentration of a high-molecular organic substance in the vicinity of the surface of the membrane significantly increases with an increase in the permeation flux and a reduction in the average linear velocity compared with a substance having a small molecular weight, such as NaCl, although the increase in concentration may vary somewhat depending on the type of the high-molecular substance.

Example 1

<Production of Nonwoven Fabric>

A long-fiber nonwoven fabric was prepared in the following manner in accordance with the method described in Japanese Patent Publication 2009-57654A.

Polyethylene terephthalate including titanium oxide and a copolyester having an isophthalic acid-copolymerization ratio of 10% by mole which included titanium oxide were melted at 295° C. and 280° C., respectively. The polyethylene terephthalate, which served as a core component, and the copolyester, which served as a sheath component, were extruded from orifices of a spinneret having a temperature of 300° C. such that the ratio between the weights of core and sheath was 80:20 and spun as core-sheath filaments with an ejector. The core-sheath filaments were collected on a moving net conveyor as a fiber web. The fiber web was subjected to thermo-compression bonding with a pair of upper and lower flat rollers. Thus, a spunbond long-fiber nonwoven fabric having a thickness of 70 µm was prepared.

<Formation of Polymer Layer>

In 82 parts by weight of dimethylformamide, 18 parts by weight of polysulfone was dissolved while heating was performed at 80° C. The resulting solution was filtered and degassed to form a polysulfone solution used for forming a polymer layer. The polysulfone solution was applied to one of the surfaces of the above long-fiber nonwoven fabric. The resulting nonwoven fabric was placed in solidifying water having a temperature of 35° C. in order to perform phase separation and subsequently washed with water in order to remove the solvent remaining in the membrane. Thus, a polysulfone layer having a thickness of 30 µm was formed.

<Formation of Aromatic Polyamide-Based Dense Layer>

A polyamide-based dense layer was formed on the above polysulfone layer in the following manner.

An aqueous solution including 3.0% by weight of m-phenylenediamine and 0.15% by weight of sodium lauryl sulfate was applied to the polysulfone layer disposed on the long-fiber nonwoven fabric such that the thickness of the resulting coating film was 5 mm. The excess solution was removed with a rubber-blade wiper. The coating film was brought into contact with a paraffinic hydrocarbon oil solution including 0.15% by weight of trimesic acid chloride for 5 seconds. The nonwoven fabric was subsequently placed in a drying furnace heated at 125° C. and dried for about 2 minutes in order to cure the coating film. Thus, an aromatic polyamide-based dense layer having a thickness of 0.2 µm was formed.

The resulting reverse osmosis membrane, which included the long-fiber nonwoven fabric, the polymer layer, and the aromatic polyamide-based dense layer that were stacked on top of one another, had a thickness (total thickness) of 0.10 mm. The rejection and the permeation flux of the reverse osmosis membrane which were determined at an evaluation pressure of 0.75 MPa were 99.3% and 1.2 m/d, respectively.

<Water Flow Test>

Simulating an 8-inch spiral reverse-osmosis-membrane element having a membrane area of 44.0 m², the above reverse osmosis membrane was cut into a piece having a width of 50 mm and a length of 800 mm. The piece of the reverse osmosis membrane, a feed spacer that was composed of polypropylene and had a thickness of 0.71 mm, and a permeate spacer that was composed of a ceramic (a porous ceramic sintered body) and had a thickness of 3 mm were attached to a test flat-membrane cell illustrated in FIG. 3.

The flat-membrane cell illustrated in FIG. 3 includes channel-forming members 21, 22, and 23 made of an acrylic resin; pressure-resistant reinforcing members 24 and 25 made of SUS; and a membrane unit including a feed spacer 11, a permeate spacer 12, and a reverse osmosis membrane 10 interposed between the feed spacer 11 and the permeate spacer 12. The membrane unit is disposed in a space defined by the channel-forming members 21, 22, and 23 and the pressure-resistant reinforcing members 24 and 25.

The raw water fed onto the primary side of the reverse osmosis membrane 10 through a raw-water inlet 13 flows along the feed spacer 11, while the permeate passed through the reverse osmosis membrane 10 is discharged from a permeate outlet 15 through the permeate spacer 12. The concentrate is discharged through a concentrate outlet 14.

The raw water used was water produced by treating biologically treated water by coagulation and filtration. The raw water was passed into the flat-membrane cell such that the permeation flux was 0.6 m/d and the flow rate of the concentrate was 0.11 m/s in terms of linear velocity. After a lapse of 500 hours, the amount of permeate was measured.

The amount of permeate was 1.04 m³/h in terms of 8-inch element. The concentration of a high-molecular organic substance having a molecular weight of 10,000 or more in the raw water was 0.05 ppm.

Example 2

A long-fiber nonwoven fabric was prepared in the following manner in accordance with the method described in WO2010/126113.

In order to form a first surface layer, polyethylene terephthalate was extruded and spun as filaments toward the surface of a moving net at a spinning temperature of 300° C. by a spunbond method. Thus, a long-fiber web was formed on the collection net. In order to form an intermediate layer, polyethylene terephthalate was spun by melt blowing at a spinning temperature of 300° C., and the resulting melt-blown long-fiber layer was blown to the long-fiber web layer, which was formed by the above spunbond method. On the resulting multilayer web, a long-fiber web layer, which served as a second surface layer, was directly formed by the same method as the long-fiber web used as a first surface layer. The multilayer web was subsequently subjected to thermo-compression bonding with heated flat calender rollers. Thus, a multilayer web including the spunbond long-fiber layer, the melt-blown long-fiber layer, and the spunbond long-fiber layer was formed. The multilayer web was subjected to thermo-compression bonding by calender rolling on the second-surface-layer side and immediately rapidly cooled with water-cooling rollers. Then, the multilayer web was subjected to thermo-compression bonding by calender rolling on the first-surface-layer side under the same conditions. That is, the multilayer web was subjected to thermo-compression bonding on the both sides. Thus, a long-fiber nonwoven fabric was prepared.

The long-fiber nonwoven fabric included an intermediate layer that was a long-fiber nonwoven fabric layer having a fiber diameter of 1.7 µm and first and second surface layers composed of long fibers having diameters of 9 µm and 10 µm, respectively, which were disposed on the respective surfaces of the intermediate layer. The total thickness of the long-fiber nonwoven fabric was 50 µm.

On the long-fiber nonwoven fabric, a polymer layer having a thickness of 10 µm and an aromatic polyamide-based dense layer having a thickness of 0.2 µm were formed as in Example 1. Thus, a reverse osmosis membrane was prepared.

The reverse osmosis membrane had a thickness (total thickness) of 0.06 mm. The rejection and the permeation flux of the reverse osmosis membrane which were determined at an evaluation pressure of 0.75 MPa were 99.3% and 1.2 m/d, respectively.

Simulating an 8-inch spiral reverse-osmosis-membrane element having a membrane area of 47.3 m², the above reverse osmosis membrane was cut into a piece having a width of 50 mm and a length of 800 mm. The piece of the reverse osmosis membrane, a feed spacer, and a permeate spacer were charged into a test flat-membrane cell as in Example 1. The test flat-membrane cell was subjected to a water flow test as in Example 1. After a lapse of 500 hours, the amount of permeate was measured. Table 2 summarizes the results. The initial amount of permeate was 1.18 m³/h in terms of 8-inch element.

Example 3

A long-fiber nonwoven fabric was prepared in the following manner in accordance with the method described in WO2010/126109.

In order to form a first surface layer, polyethylene terephthalate was extruded and spun as filaments toward the surface of a moving collection net at a spinning temperature of 310° C. by a spunbond method. The filaments were opened to a sufficient degree by using charge generated by corona charging. Thus, a long-fiber web was formed on the collection net. In order to form an intermediate layer, polyethylene terephthalate was spun by melt blowing at a spinning temperature of 300° C., and the resulting fibers were blown to the long-fiber web layer. On the resulting multilayer web, a long-fiber web was formed by the same method as the long-fiber web used as a first surface layer. Thus, a long-fiber nonwoven fabric including the spunbond long-fiber layer, the melt-blown long-fiber layer, and the spunbond long-fiber layer was formed. The long-fiber nonwoven fabric was subjected to thermo-compression bonding as in Example 2.

The long-fiber nonwoven fabric included an intermediate layer that was a long-fiber nonwoven fabric layer having a fiber diameter of 1.7 µm and first and second surface layers composed of long fibers having diameters of 9 µm and 10 µm, respectively, which were disposed on the respective surfaces of the intermediate layer. The total thickness of the long-fiber nonwoven fabric was 20 µm.

On the long-fiber nonwoven fabric, a polymer layer having a thickness of 10 μm and an aromatic polyamide-based dense layer having a thickness of 0.2 μm were formed as in Example 1. Thus, a reverse osmosis membrane was prepared.

The reverse osmosis membrane had a thickness (total thickness) of 0.03 mm. The rejection and the permeation flux of the reverse osmosis membrane which were determined at an evaluation pressure of 0.75 MPa were 99.3% and 1.2 m/d, respectively.

Simulating an 8-inch spiral reverse-osmosis-membrane element having a membrane area of 50.2 m², the above reverse osmosis membrane was cut into a piece having a width of 50 mm and a length of 800 mm. The piece of the reverse osmosis membrane, a feed spacer, and a permeate spacer were charged into a test flat-membrane cell as in Example 1. The test flat-membrane cell was subjected to a water flow test as in Example 1. After a lapse of 500 hours, the amount of permeate was measured. Table 2 summarizes the results. The initial amount of permeate was 1.26 m³/h in terms of 8-inch element.

Example 4

A test was conducted as in Example 3, except that the permeation flux was changed to 0.5 m/d. After a lapse of 500 hours, the amount of permeate was measured. Table 2 summarizes the results. The initial amount of permeate was 1.05 m³/h in terms of 8-inch element.

Example 5

A test was conducted as in Example 3, except that the permeation flux was changed to 0.45 m/d. After a lapse of 500 hours, the amount of permeate was measured. Table 2 summarizes the results. The initial amount of permeate was 0.94 m³/h in terms of 8-inch element.

Example 6

A test was conducted as in Example 3, except that the permeation flux was changed to 0.4 m/d. After a lapse of 500 hours, the amount of permeate was measured. Table 2 summarizes the results. The initial amount of permeate was 0.84 m³/h in terms of 8-inch element.

Comparative Example 1

A flat membrane having a width of 50 mm and a length of 800 mm was cut from an RO element "SUL-G20" produced by Toray Industries, Inc. The flat membrane, a feed spacer (thickness: 0.71 mm), and a permeate spacer were charged into a test flat-membrane cell as in Example 1. The rejection and the permeation flux of SUL-G20 which were determined at an evaluation pressure of 0.75 MPa were 99.7% and 0.85 m/d, respectively. The thickness of the membrane included in SUL-G20 was 0.13 mm. A water flow test was conducted as in Example 1, except that the permeation flux was changed to 0.7 m/d. After a lapse of 500 hours, the amount of permeate was measured. Table 2 summarizes the results. The initial amount of permeate was 1.22 m³/h in terms of 8-inch element.

Comparative Example 2

A water flow test was conducted as in Comparative example 1, except that a feed spacer that was composed of polypropylene and had a thickness of 0.86 mm was used. After a lapse of 500 hours, the amount of permeate was measured. Table 2 summarizes the results. The initial amount of permeate was 1.08 m³/h in terms of 8-inch element.

Comparative Example 3

A test was conducted as in Comparative example 1, except that the concentration of a high-molecular organic substance having a molecular weight of 10,000 or more in the raw water used was 0.005 ppm. After a lapse of 500 hours, the amount of permeate was measured. Table 2 summarizes the results. The initial amount of permeate was 1.22 m³/h in terms of 8-inch element, which was equal to the initial amount of permeate measured in Comparative example 1.

TABLE 2

| | Thickness of reverse osmosis membrane (mm) | Area of membrane (m²) | Permeation flux (m/d) | Line velocity of concentrate (m/s) | Concentration of organic substance in raw water (ppm) | Initial amount of permeate (m³/h) | Amount of permeate after 500 hours (m³/h) | Ratio against initial amount of permeate (%)※ |
|---|---|---|---|---|---|---|---|---|
| Exampel 1 | 0.10 | 44.0 | 0.6 | 0.11 | 0.05 | 1.10 | 1.04 | 94.5 |
| Exampel 2 | 0.06 | 47.3 | 0.6 | 0.11 | 0.05 | 1.18 | 1.10 | 93.2 |
| Exampel 3 | 0.03 | 50.2 | 0.6 | 0.11 | 0.05 | 1.26 | 1.18 | 93.7 |
| Exampel 4 | 0.03 | 50.2 | 0.5 | 0.11 | 0.05 | 1.05 | 1.01 | 96.2 |
| Exampel 5 | 0.03 | 50.2 | 0.45 | 0.11 | 0.05 | 0.94 | 0.94 | 100 |
| Exampel 6 | 0.03 | 50.2 | 0.4 | 0.11 | 0.05 | 0.84 | 0.84 | 100 |
| Comparative Example 1 | 0.13 | 41.8 | 0.7 | 0.11 | 0.05 | 1.22 | 0.91 | 74.6 |
| Comparative Example 2 | 0.13 | 37.1 | 0.7 | 0.11 | 0.05 | 1.08 | 0.79 | 73.1 |
| Comparative Example 3 | 0.13 | 41.8 | 0.7 | 0.11 | 0.005 | 1.22 | 1.14 | 93.4 |

※(Amount of permeate after 500 hours/Initial amount of permeate) × 100

As is clear from the results shown in Table 2, in Examples 1 to 6, the amount of permeate was consistently large even after the lapse of 500 hours. In particular, in Examples 5 and 6, the amount of permeate did not decrease after the lapse of 500 hours.

In contrast, in Comparative examples 1 and 2, the amount of permeate significantly decreased after the lapse of 500 hours although the initial amount of permeate was large. As shown in Comparative example 3, the permeation flux decreased slowly when the concentration of a high-molecular organic substance having a molecular weight of 10,000 or more in the raw water was low.

INDUSTRIAL APPLICABILITY

The present invention may be applied to various reverse-osmosis-membrane devices used in seawater desalination, ultrapure water production, industrial water treatment, wastewater reclamation, and the like. The present invention is particularly suitably applied to a reverse-osmosis-membrane device that treats biologically treated water and, in particular, MBR-treated water.

Although the present invention has been described in detail with reference to particular embodiments, it is apparent to a person skilled in the art that various modifications can be made therein without departing from the spirit and scope of the present invention.

The present application is based on Japanese Patent Application No. 2013-092657 filed on Apr. 25, 2013, which is incorporated herein by reference in its entirety.

REFERENCE SIGNS LIST

1 BIOLOGICAL TREATMENT MEANS
2 COAGULATION TREATMENT MEANS
3 SOLID-LIQUID SEPARATION MEANS
4 FILTRATION MEANS
5 SAFETY FILTER
6 REVERSE-OSMOSIS-MEMBRANE DEVICE
7 MBR (IMMERSED MEMBRANE-SEPARATION DEVICE)
10 REVERSE OSMOSIS MEMBRANE
11 FEED SPACER
12 PERMEATE SPACER

The invention claimed is:

1. A method for operating a reverse-osmosis-membrane device that treats raw water including a high-molecular organic substance, the method comprising:

flowing the raw water through the reverse-osmosis-membrane device such that a permeation flux in operation of the reverse-osmosis-membrane device is 0.6 m/d or less, wherein the raw water includes the high-molecular organic substance having a molecular weight of 10,000 or more at a concentration of 0.05 ppm to 0.5 ppm, the reverse-osmosis-membrane device includes a reverse-osmosis-membrane element including a membrane unit, and the membrane unit includes a reverse osmosis membrane having a thickness of 0.01 mm to 0.1 mm, a feed spacer disposed on a surface of the reverse osmosis membrane, and a permeate spacer disposed on other surface of the reverse osmosis membrane.

2. The method for operating the reverse-osmosis-membrane device according to claim 1, wherein the permeation flux is 0.45 m/d or less.

3. The method for operating the reverse-osmosis-membrane device according to claim 1, wherein the reverse-osmosis-membrane element is a spiral reverse-osmosis-membrane element.

4. The method for operating the reverse-osmosis-membrane device according to claim 1, wherein the raw water is water treated with a membrane bioreactor.

5. The method for operating the reverse-osmosis-membrane device according to claim 1, wherein the reverse osmosis membrane has a thickness of 0.03 to 0.07 mm.

6. The method for operating the reverse-osmosis-membrane device according to claim 5, wherein the feed spacer has a thickness of 0.6 to 0.9 mm.

7. The method for operating the reverse-osmosis-membrane device according to claim 5, wherein the permeate spacer has a thickness of 0.1 to 0.25 mm.

* * * * *